United States Patent

[11] 3,607,021

| [72] | Inventors | Joel B. Jacobs<br>Lakewood;<br>Steve Taborosi, Woodbridge, both of N.J. |
|---|---|---|
| [21] | Appl. No. | 778,304 |
| [22] | Filed | Nov. 22, 1968 |
| [45] | Patented | Sept. 21, 1971 |
| [73] | Assignee | FMC Corporation<br>New York, N.Y. |

[54] PROCESS FOR CONTROLLING DENSITY OF TRISODIUM PHOSPHATE
6 Claims, No Drawings

| [52] | U.S. Cl. | 23/107 |
|---|---|---|
| [51] | Int. Cl. | C01b 25/30 |
| [50] | Field of Search | 23/106, 107; 71/43 |

[56] References Cited
UNITED STATES PATENTS

| 1,688,112 | 10/1928 | Booth et al. | 23/107 |
|---|---|---|---|
| 1,689,547 | 10/1928 | Carothers | 23/107 |
| 2,390,400 | 12/1945 | Taylor | 23/107 |
| 2,977,190 | 3/1961 | Yates et al. | 23/107 |
| 3,086,844 | 4/1963 | Beltz et al. | 23/107 |

FOREIGN PATENTS

| 671,658 | 1966 | Belgium | 23/107 |
|---|---|---|---|

*Primary Examiner*—Oscar R. Vertiz
*Assistant Examiner*—Gregory A. Heller
*Attorneys*—Thomas B. Graham, Milton Zucker and Eugene G. Seems ABSTRACT: The density of trisodium phosphate in anhydrous form and trisodium phosphate monohydrate is controlled by alkalizing a solution of phosphoric acid, monosodium phosphate, or disodium phosphate, and crystallizing it in the presence of carbon dioxide to alter the crystallization pattern of the salt from the liquor in the dryer, thereby to develop a product of improved uniform high density, subject to close regulation, related to the carbon dioxide in the liquor and flow of carbon dioxide to the liquor as the evaporation and crystallization are carried out.

PROCESS FOR CONTROLLING DENSITY OF TRISODIUM PHOSPHATE

BACKGROUND OF THE INVENTION

Trisodium phosphate anhydrous and trisodium phosphate monohydrate are well known commercial products, but in their industrial form they have shown considerable variability in bulk density as obtained from the dryer. (Monohydrate chemically is actually a mixture of $.2H_2O$, the dihydrate, and $.½H_2O$), the hemihydrate). The range of density of trisodium phosphate monohydrate should be from 0.80 to 0.95 gram per milliliter, In conventional methods of preparation wherein a routine neutralization of the mother liquor is carried out, mother liquor is dried and the range of density of the product will be from 0.65 to 0.85 gram per milliliter. In other words one may not have a product from the process which will come within the desired optimum range of acceptable specifications.

Where occasional industrial requirements are for a bulk density greater then 1.0, it becomes an extraordinarily difficult technological matter to meet the requirements. Routinely, virtually any large scale user would prefer high density material, simply because the 10 to 15 percent improvement in bulk density of solid products represents at least that much gain in shipping space and storage space made available for another purpose and also the higher density aids packaging and tableting.

Hence, existing practice will produce and existing products will show bulk densities that will vary from 0.65 to 1.2 gram per milliliter and apparently the bulk density of product is virtually impossible to control, or, at least, under current practice it is virtually impossible to relate to the neutralization conditions.

Accordingly, a fundamental object of this invention is to provide a process by which the bulk density of trisodium phosphate can be controlled to produce an end dry product, anhydrous, or monohydrate, of optimum density approaching 1.0 and often exceeding 1.0 to a level of 1.2 grams per milliliter.

Other objects which are advantages of the invention will in part be obvious and in part appear hereinafter.

DETAILED DESCRIPTION OF THE INVENTION

We have discovered that carbon dioxide, the gas as generated, or extraneous carbon dioxide, or both, in a trisodium phosphate solution in a makeup tank as the solution is being brought to the proper level of neutralization, said carbon dioxide being maintained in the solution to and through the evaporation for the separation of solid crystalline material makes it possible to produce high density trisodium phosphate, either in the anhydrous or monohydrate form. The control over the density is directly related to the employment of carbon dioxide in the trisodium phosphate solution being evaporated. The amount of $CO_2$ should be at least about 1 percent, by weight, of the solution to saturation, which will be about 8 to 10 percent. A good operating level for the carbon dioxide concentration is 3½ to 4 percent. It is our observation that the presence of the carbon dioxide permeating through the solution has the effect of altering the crystal form of the material, thereby, to produce a crystalline material of essentially uniform high bulk density in the preferred optimum range.

We have found that carbon dioxide is an effective additive when it is passed into the mother liquor of the sodium phosphate and, accordingly, as a chemical means it changes the crystal group pattern as solid material is formed in the dryer from the feed liquor and it causes an increase in the density of the product without affecting its other chemical properties.

Trisodium phosphate is conventionally made by reacting a sodium carbonate or hydroxide with phosphoric acid in the proper proportions. Usually about 75 percent phosphoric acid is used; monosodium phosphate is also useful. This is an optimum economical level, with 70 percent a low level for the purpose. In conventional practice, sodium carbonate is used to react with the phosphoric acid about half way to complete reaction. At this point almost all of the carbon dioxide from the sodium carbonate escapes from the hot slightly acid liquor. The reaction is then completed with sodium hydroxide as the neutralizing agent. The liquor is essentially free from carbon dioxide, and when dried produces a low density product.

In the process according to our invention we develop extra carbon dioxide in the solution by increasing the amount of sodium carbonate used to the point where it reacts with about two thirds of the phosphoric acid. That is, it is about sufficient to bring the phosphate salt to the disodium monohydrogen phosphate level. At this point the mother liquor carrying the solution is slightly alkaline, pH level 9.0 to 9.3. Hence, some of the carbon dioxide formed through the neutralization remains dissolved in the solution. We then complete the neutralization with sodium hydroxide. This solution containing a substantial quantity of carbon dioxide is then dried and it is our observation that it produces a high density product. The carbon dioxide is, of course, expelled from the water during the drying process. It is during this stage, that is, final neutralization with sodium hydroxide that we find it is useful also to add carbon dioxide in gaseous form. It is passed directly into the solution in the makeup tank to the point of practically saturating it at the temperature of drying—190° F. to 212° F. In practice the phosphoric acid at 70 to 80 percent concentration, 70 percent preferred, is neutralized in a makeup tank. Carbon dioxide is added to it from a cylinder using a sparger and bubbling the gas directly into and through the solution. This is kept up until the solution is fed to the dryer.

We prefer a cylindrical, direct fired dryer, countercurrent. Typical operation involves feeding the solution in at 95° C. to 110° C. (i.e. approximately boiling); inlet gas is at 800° C. to 1,000° C. and outlet gas is at 150° C. to 225° C. The liquor turns to a paste in the dryer and then to a solid near the exit. The phosphate is discharged, dry, at 350° C. to 450° C. for the anhydrous; 140° C. to 180° C. for the monohydrate.

We believe that the carbon dioxide thus present in the solution modifies the crystal habit of hydrates coming out of solution, causing lower hydrates to form. When these are further dried to the desired composition, either monohydrate or anhydrous as desired, the remaining particles have higher densities than products made from precursor crystals which contained more water of crystallization.

Generally, it is desirable to have in the mother liquor solution of phosphoric acid, soda ash, caustic soda and an amount of carbon dioxide which could be as much as 10 percent and may be as little as 2 percent, by weight. That is, the solution may be substantially saturated with carbon dioxide under the conditions of neutralization. Completing the neutralization with sodium hydroxide is routinely done. The solution then has appropriate density to carry on the evaporation which is carried out at substantially the boiling temperature. It should be recognized that a solution carrying the substantial amount of dissolved sodium phosphate indicated will actually have a boiling temperature considerably higher than that of water. Hence, we use a countercurrent direct fired gas rotary dryer. Some carbon dioxide is picked up by the solution from the gas, but in small amount probably not exceeding one-half percent.

To illustrate the invention, and to demonstrate the effect of the presence of carbon dioxide during the completion of the neutralization and initial crystallization and how it induces the formation of end products having increased density, reference can be had to the following illustrative examples:

Example 1

Phosphoric acid, sodium carbonate, caustic soda, sodium hydroxide and water were reacted to produce sodium phosphate solutions having molar ratios of sodium to phosphorus of 2.97 to 3.03, densities of 45 to 48° Baume at 200° F., 37.47 percent to 38.5 percent, and residual carbon dioxide content of 2 to 6 percent. These solutions were dried and calcined in a rotary drier entering at a temperature of 95° C. to 110° C. to form trisodium phosphate monohydrate. The material was discharged at 140° C. to 180° C., cooled, crushed and screened to yield a granular product essentially between 14 mesh and 100 mesh in particle size. The bulk densities of the products as sampled at intervals ranged from 0.99 to 1.06 grams per milliliter, measured by the Solvay method.

Example 2

Sodium phosphate solutions were made as in Example 1, except that less sodium carbonate was used to be equivalent of 1½ sodium hydrogen phosphate; all the carbon dioxide was boiled out of the liquor; and a proportionately larger quantity of caustic soda was used to adjust the sodium to phosphorus ratio to 2.97 to 3.03. When dried under the conditions of Example 1 and the product crushed and screened, these solutions yielded granular products having densities ranging from 0.62 to 0.88 gram per milliliter.

Comparison of Examples 1 and 2 shows the pronounced effect of residual carbon dioxide on the final product density of trisodium phosphate monohydrate.

Example 3

Sodium phosphate solutions were made up as in Example 1, having residual carbon dioxide contents of 2 to 5 percent, by weight. These were dried as in Example 1 to make trisodium phosphate monohydrate having moisture contents between 4.2 and 7.7 percent. After crushing and screening to a granular product essentially between 14 to 100 mesh in particle size, the bulk densities ranged from 0.84 to 0.92.

Example 4

Sodium phosphate solutions were made up as in Example 3, without residual carbon dioxide. These solutions were dried as in Example 1 to make trisodium phosphate monohydrate with moisture contents between 5.4 and 7.6 percent. The granular product had densities ranging from 0.74 to 0.78.

Comparison of Examples 3 and 4 shows the pronounced effect of residual carbon dioxide on the density of trisodium phosphate monohydrate.

In summary, from inspection of the examples it will be observed that about 3½ percent carbon dioxide in the sodium phosphate feed liquor passed to the drying equipment raises the average bulk density of the trisodium phosphate anhydrous from 0.73 to 1.03 and the average bulk density of the trisodium phosphate monohydrate from 0.75 to 0.88.

Hence, the operation representing the preferred normal practice of the invention is to neutralize the phosphoric acid to about two-thirds completion, that is to a sodium to phosphorus mole ratio of about 2.0, with soda ash. At this ratio the solution is alkaline and some of the carbon dioxide remains in the solution. The neutralization reaction carried to sodium to phosphorus ratio 2.97, or slightly higher, is completed with caustic soda; the solution is at a near desired concentration and temperature, and is ready to be dried. Actually, drying of a very dilute solution could be carried out, but it would be merely an exercise in water evaporation. In practice phosphoric acid of about 70 to 75 percent concentration is neutralized and evaporated to form the salts. Drying is normally in a direct-fired, countercurrent rotary drier.

The addition of carbon dioxide is not limited to the procedure outlined above. Carbon dioxide can be added entirely as a gas, although this would appear to be uneconomical under usual manufacturing conditions. When added as a gas it is preferred that it be an auxiliary amount used with that developed in the neutralization. It can also be added as a carbonate to a carbon dioxide-free trisodium phosphate solution, such as occurs from dissolving rework material. In this case a proportionate quantity of phosphoric acid must also be added to maintain the proper sodium to phosphorus ratio.

It is important to observe from the data thus presented, that an important aspect of the process is to obtain carbonate in the solution of the trisodium phosphate in the sense that carbon dioxide is present in solution, virtually saturating the solution. The effect is obtainable by the use of sodium carbonate as the neutralizing agent, but the addition of carbon dioxide from an extraneous source is perfectly feasible and chemically it makes no difference in the solution itself. The degree of carbonation when the solution arrives at the drier should be 2 percent or as much as 6 percent dissolved carbon dioxide, or virtually a saturated solution.

ADVANTAGES OVER PREVIOUS PRACTICE

Before the discovery of the effect of carbon dioxide on density, it was not possible to produce material in the higher bulk density ranges. Also the density tended to be quite variable, probably from slight but unknown variations in carbon dioxide content caused by failure to remove it completely during solution makeup.

This discovery allows us to produce the higher densities. Use of this effect also makes it possible to produce low density material consistently when required, by freeing the solution completely of carbon dioxide. The relationship is direct; small amounts of carbon dioxide, 2 percent give small increase in density and maximum density is had with saturated solutions.

The principal advantage of the process is—it provides the operator with the ability to produce high density trisodium phosphate, anhydrous and monohydrate.

In operation it was found that the following conditions prevailing in a trial run consistently gave the results sought:
Solution—2.970 to 3.030 Na/P
Density—45 to 47° Baume (37.4 percent to 39.3 percent)
Temperature—95° C. to 110° C. (solution entering dryer)
Dryer—countercurrent, direct fired
  Gas Temperature—800° C. to 1,000° C.
  Exit Gas—150° C. to 225° C.
Product Temperature——350° C. to 405° C.
Must be hot to drive $CO_2$ out of product.
By operating and feeding the liquor to a rotary dryer anhydrous trisodium phosphate was produced having bulk density of 0.90. This compared with the routine production on the same dryer of bulk density of 0.75.

The difference was the retention of the carbon dioxide in the feed liquor to the extent of 3 to 4 percent in the feed liquor, thereby confirming the direct relationship between the increase 0.15+ gram per milliliter in the average bulk density so that the end product had a bulk density of 0.90[1] gram per milliliter.

Example 5

Production Operation

For general production operation the feed liquor was made up to 1.990 Na/P ratio with soda ash and raised to 2.97–3.00 with caustic soda to retain 3 to 4 percent $CO_2$ in the liquor. Typical high density dry conditions, as outlined in Table I were maintained during these tests. Five liquor batches were used producing about 90,000 pounds of material. After the trial the dryer operation was altered to produce lower density material (.65–.90 gram/cc.). The change in dryer operation to produce the less dense product consisted of increasing the feed rate and the dryer speed.

The test run was successful in that the bulk density averaged 1.10 grams per milliliter, with a range of 1.08 to 1.14 grams per milliliter which is 0.15 grams per milliliter higher than was consistently made in conventional operations (Table II). As with trisodium phosphate monohydrate, the increase in bulk density is attributed to the increased $CO_2$ content of the feed liquor which changes the crystal habit in the wet end of the dryer. As with high density runs of the past, a lower feed rate was required (13.8 gallons per minute as opposed to 20 gallons per minute).

TABLE I

High Density Trisodium Phosphate
Direct Fired - Rotary Drum Dryer

| | |
|---|---|
| Feed Rate | 13.8 gallons per minute |
| Gas Temperature | 1,000° C. |
| Dryer Speed | 4 to 5 r.p.m. |
| Material Temperature | 480° C. to 550° C. |
| Shell Temperature | 150° C. to 200° C. |
| Dryer Load | 150 to 160 amps |
| Tail Fan Load | 30 amps |
| Feed Liquor Ratio | 2.97 to 3.00 Na/P |
| Feed Liquor Concentration | 45° to 46° Be' |
| Mush Position | 24 to 30 feet from discharge |

TABLE II

Product Quality

| Analysis | High | Low | Average |
|---|---|---|---|
| Alkalinity (wt.%) | 37.8 | 37.6 | 37.7 |
| $P_2O_5$ (wt.%) | 43.1 | 42.6 | 42.9 |
| LOI at 550° C. (wt.%) | 0.5 | 0.1 | 0.3 |
| Light transmission (%) | 99.5 | 99.5 | 99.5 |
| Iron p.p.m. Fe) | 30 | 15 | 22.3 |
| Density (gms./cc. | 1.14 | 1.08 | 1.10 |
| Screens: -20 (wt.%) | 98.4 | 67.0 | 86.6 |
| -100 (wt.%) | 10.0 | 0.4 | 1.76 |

BATCH ANALYSIS

| Batch | Alk. | $P_2O_5$ | LOI at 500° C. | Light transmission | Fe | Density | Screens -20 | Screens -100 |
|---|---|---|---|---|---|---|---|---|
| 1 | 37.6 | 42.9 | 0.1 | 99.5 | 15 | 1.14 | 74 | 2.5 |
| 2 | | | | | | 1.08 | 98.4 | 0.5 |
| 3 | | | | | | 1.12 | 96.3 | 0.8 |
| 4 | 37.8 | 43.1 | 0.5 | 99.5 | 22 | 1.10 | 98.1 | 0.4 |
| 5 | | | | | | 1.09 | 95.4 | 0.8 |
| 6 | | | | | | 1.08 | 90.6 | 0.9 |
| 7 | 37.6 | 42.6 | 0.3 | 99.5 | 30 | 1.11 | 83 | 10.0 |
| 8 | | | | | | 1.09 | 87 | 1.1 |
| 9 | | | | | | 1.10 | 76 | 0.5 |
| 10 | 37.8 | 43.0 | 0.4 | 99.5 | 22 | 1.09 | 87 | 1.0 |
| 11 | | | | | | 1.09 | 67 | 0.9 |

Bulk density Solvay method is a measure of the product density carried out as follows: A tared container is filled to a defined depth with product dropped into it from a funnel. The end of the funnel is held 1 inch above the top edge of the container. The contents are leveled with the top of the container using a spatula; the container is tapped on the bench once; container of fixed volume is noted and weighed. The weight of product and volume give the bulk density.

What is claimed is:

1. A process for preparing high density trisodium phosphate anhydrous which comprises
    1. neutralizing a solution of phosphoric acid or a monosodium phosphate with a sodium carbonate or sodium hydroxide;
    2. adjusting $CO_2$ content to 2 percent to saturation with carbon dioxide and
    3. evaporating said solution to produce said sodium phosphate at a temperature in the range from about 95° C. to boiling and drying it at a temperature above about 350° C.
    4. thereby to separate therefrom anhydrous trisodium phosphate, crystalline in form and having a bulk density in the range from 0.80 to 1.20 grams per milliliter.

2. The method in accordance with claim 1 which comprises neutralizing the phosphoric acid with sodium carbonate to the disodium stage and completing it with sodium hydroxide, adding extraneous carbon dioxide to the solution to maintain the concentration of carbon dioxide in the solution in the range from 2 percent to 6 percent prior to evaporation, and evaporating said solution.

3. A method in accordance with claim 2 in which the concentration of carbon dioxide in the solution is maintained at a level of at least about 4 percent.

4. A process for preparing high density trisodium phosphate monohydrate which comprises
    1. neutralizing a solution of phosphoric acid or a monosodium phosphate with a sodium carbonate or sodium hydroxide
    2. adjusting $CO_2$ content to 2 percent to saturation with carbon dioxide and
    3. evaporating said solution to produce said sodium phosphate at a temperature in the range from about 95° C. to boiling and drying it at a temperature in the range from 140° to 180° C.
    4. thereby to separate therefrom a trisodium phosphate monohydrate, crystalline in form and having a bulk density in the range from 0.80 to 1.20 grams per milliliter.

5. The method in accordance with claim 4 which comprises neutralizing the phosphoric acid with sodium carbonate to the disodium stage and completing it with sodium hydroxide, adding extraneous carbon dioxide to the solution to maintain the concentration of carbon dioxide in the solution in the range from 2 percent to 6 percent prior to evaporation, and evaporating said solution.

6. A method in accordance with claim 5 in which the concentration of carbon dioxide in the solution is maintained at a level of at least about 4 percent.